UNITED STATES PATENT OFFICE 2,551,026

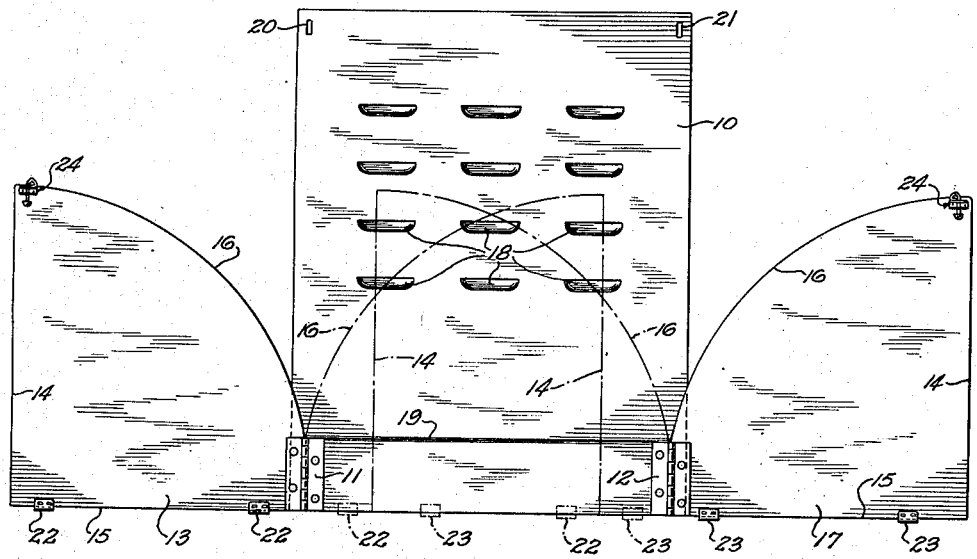
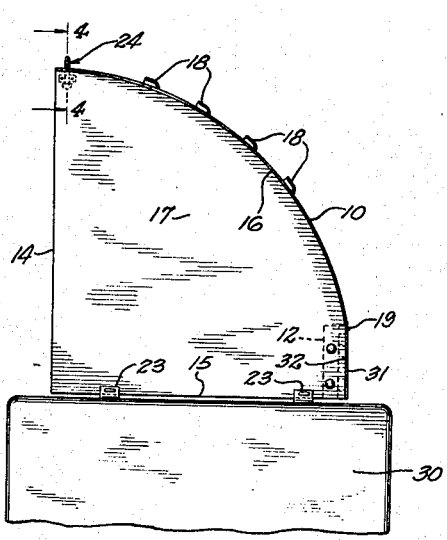
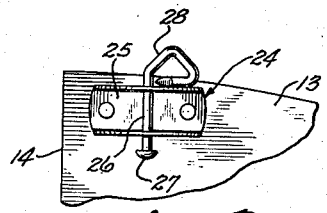
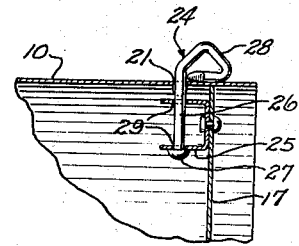

COLLAPSIBLE HOOD FOR KITCHEN STOVES

Walter W. Loeher, Jr., and Lois E. Loeher, Milwaukee, Wis.

Application May 12, 1949, Serial No. 92,922

6 Claims. (Cl. 126—299)

This invention relates to improvements in collapsible hoods for kitchen stoves.

During cooking or frying of foods on the conventional kitchen range it frequently happens that grease or particles of the food spatter onto the kitchen wall adjacent the stove, or on adjacent furniture. This results in extra work for the housewife who must frequently wash the kitchen wall to keep it neat and presentable. Since the spattered material is often difficult to remove, continued cleaning soon results in the wearing away of the wall paint with attendant contrast between the colors of the washed and the unwashed portions of said wall.

With the above in mind, it is a general object of the invention to provide a removable hood adapted to be placed over the burners of a kitchen stove for the purpose of preventing spattering of grease and food particles onto adjacent walls, furniture or the like.

Another object of the invention is to provide a hood of the class described which is collapsible, and which when collapsed, is substantially flat so that it can be easily stored.

A further object of the invention is to provide a hood of the class described which is provided with a plurality of louvres for permitting smoke and heat to pass upwardly therethrough, thereby preventing said smoke and heat from being emitted from the open front of said hood to the annoyance of the person doing the cooking.

A further object of the invention is to provide a hood of the class described which is comprised of three substantially flat sheet metal wall members hinged together, which, when in assembled condition, form a hood having two opposing substantially flat side walls, a short substantially flat rear wall, and an arcuate top wall.

A further object of the invention is to provide a hood of the class described wherein the center section thereof is made of resilient sheet material which can be readily bent in assembling the hood, and which has the inherent characteristic of returning to its original flat condition when the device is being collapsed.

A further object of the invention is to provide a hood of the class described which is held in assembled condition by only two simple latch members and which, upon release of said members, readily returns to collapsed position.

A further object of the invention is to provide a hood of the class described, which is light in weight and easy to handle, which is inexpensive and easy to manufacture, and which is well adapted for the purposes described.

With the above and other objects in view the invention consists of the improved hood for kitchen stoves, and all of its parts and combinations, as set forth in the claims, and all equivalents thereof.

In the drawing accompanying and forming a part of this specification, wherein is shown one complete embodiment of the preferred form of the invention, and wherein the same reference characters indicate the same parts in all of the views:

Fig. 1 is a front elevational view of the improved hood in collapsed condition with the side walls thereof swung outwardly for clarity, the inwardly swung position thereof being shown in dot and dash lines;

Fig. 2 is a side elevational view of the improved hood in assembled condition and positioned on top of a stove.

Fig. 3 is an enlarged fragmentary detail view showing one of the side wall latch assemblies; and Fig. 4 is an enlarged vertical sectional view taken approximately along the line 4—4 of Fig. 2.

Referring more particularly to the drawing, the numeral 10 indicates a substantially rectangular sheet of resilient metal such as spring aluminum. Fixed to one side of the sheet 10 adjacent the side edges thereof and at one end are a pair of hinges 11 and 12. The hinge 11 connects the sheet 10 with a side wall sheet 13. The sheet 13 has a front edge 14 which extends at a right angle to the bottom edge 15 thereof. The sheet 13 also has an arcuate upper edge 16 as well as a straight rear edge 32 (see Fig. 2) adjacent its hinge. The hinge 12 connects a side wall sheet 17 with the sheet 10. The sheet 17 is substantially identical in shape with the sheet 13 and the corresponding edges thereof are indicated by the same numerals. It is to be noted that the pintles of the hinges 11 and 12 are located inwardly of the side edges of the sheet 10.

The sheet 10 has a length approximately equal to the length of the edge 16 of the sheet 13, and is formed with a plurality of louvres 18 which are open at their upper edges, as shown. The sheet 10 is formed with a score line 19 extending transversely from the top of the hinge 11 to the top of the hinge 12.

The sheet 10 is formed with slots 20 and 21 therethrough adjacent each side edge at the end opposite the hinges 11 and 12.

Fixed to the lower edge 15 of the sheet 13 may be a pair of spaced rubber feet or pads 22, and similarly fixed to the lower edge of the sheet 17 may be a pair of spaced feet or pads 23. Fixed to the sheets 13 and 17 adjacent the upper corners thereof and on the same sides as the hinges 11 and 12, are latch assemblies 24. The assemblies 24 are each composed of a channel member 25 (see Figs. 3 and 4), the flanges of which are formed with aligned apertures 29. Slidably and rotatably positioned in the apertures 29 in each of the channel members 25 is a latch member 26 which is formed at its lower end with an enlarged head 27. Above the upper flange of the channel member 25 the latch members 26 are each formed with a looped portion 28, as shown. The looped portion 28 has a width slightly less than the length of the slots 20 and 21 and each of said loops is adapted to pass through one of said slots.

When the improved hood is not in use the sheets 13 and 17 are folded toward each other and flat against the sheet 10 as is indicated by the dot and dash lines of Fig. 1. When the improved hood is in this collapsed position it is substantially flat throughout its length and can be conveniently handled and stored.

To assemble the improved hood for use it is only necessary to swing the side wall sheets 13 and 17 outwardly about 90° from their inwardly folded position and to bend the upper portion of the sheet 10 toward said sheets 13 and 17 until the arcuate edges of said sheets are engaged by the surface of the sheet 10. When the sheets 10, 13 and 17 are in this position, the loops 28 of the latch members 26 can be inserted through the cooperating slots 20 and 21 and then turned at approximately a right angle to the longitudinal axis of said slots.

The sheet 10 is held in the bent position shown in Fig. 2 by the latch assemblies 24, and when the sheets 10, 13 and 17 are so disposed they form a hood having an open front, a pair of oppositely disposed side walls, a rear wall and an arcuate top wall. The portion of the sheet 10 below the score line 19 remains substantially flat to form a rear wall 31, whereas the portion above the score line bends and becomes the arcuate top wall. The feet or pads 22 and 23 support the assembled hood and prevent slippage thereof on the top of the stove on which said hood may be placed.

The improved hood may be of sufficient size to cover several or all of the burners on the conventional gas or electric stove. Fig. 2 shows the assembled hood positioned on a stove 30. The improved hood intercepts any spattering which is directed upwardly, rearwardly, or to either side, and effectively prevents adjacent walls, furniture or the like from being subjected to said spattering.

The louvres 18 provide passageways which permit heat and smoke generated by the cooking operation to flow forwardly and upwardly therethrough, while at the same time effectively preventing any spattering therethrough. By furnishing this outlet for the heat and smoke, the latter do not billow out of the open front of the assembled hood and therefore the person doing the cooking is not subjected to heat and smoke.

To collapse the improved hood it is only necessary to rotate the latch members 26 into alignment with the slots 20 and 21 to permit said latch members to drop through said slots while the sheet 10, of its own resiliency, returns to a flattened condition. The side wall sheets 13 and 17 are then folded to the dot and dash line positions of Fig. 1, and the collapsed hood is ready to be conveniently stored, as for example, behind the stove 30, where it is within easy reach.

Various changes and modifications may be made without departing from the spirit of the invention, and all of such changes are contemplated, as may come within the scope of the claims.

What we claim is:

1. A collapsible hood for kitchen stoves comprising a normally flat, substantially rectangular sheet of resilient metal; a pair of side walls hinged to opposite side edge portions of said rectangular sheet adjacent oppositely disposed corners at one end thereof, said side walls having arcuate upper edges and being movable from a position substantially in the plane of said rectangular sheet to assembled positions wherein they project in the same direction at substantially a right angle from said sheet, and said rectangular sheet being bendable into substantial conformity with the arcuate upper edges of said side walls when said side walls are so extended; and latch means for releasably connecting said rectangular sheet to said side walls to hold the walls in assembled condition.

2. A collapsible hood for kitchen stoves comprising a normally flat, substantially rectangular sheet of resilient metal; a pair of side walls hinged to opposite side edge portions of said rectangular sheet adjacent oppositely disposed corners at one end thereof, said side walls having arcuate upper edges and being movable from a folded position against one face of said rectangular sheet to assembled positions wherein they project in the same direction at substantially a right angle from said sheet, said rectangular sheet being formed with louvres and being bendable into contact with the arcuate upper edges of said side walls when said side walls are so extended, said louvres, when the rectangular sheet is so bent, having forwardly and upwardly extending passages therethrough; and latch means for releasably connecting said rectangular sheet to said side walls to hold the walls in assembled condition.

3. A collapsible hood for kitchen stoves comprising a normally flat, substantially rectangular sheet of resilient metal; a pair of hinges fixed to opposite side edge portions of said sheet adjacent oppositely disposed corners at one end thereof, said hinges being positioned so that the hinge axes are inwardly of the side edges of the sheet; a pair of side walls having rear edge portions fixed to said hinges and having upper edges which curve upwardly and forwardly from said rear edges, said side walls being movable from a folded position against one face of said rectangular sheet to assembled positions wherein they project in the same direction at substantially a right angle from said sheet, said rectangular sheet being bendable into contact with the arcuate upper edges of said side walls when said side walls are so extended; and latch means for releasably connecting the other end of said rectangular sheet to said side walls to hold the walls in assembled condition.

4. A collapsible hood for kitchen stoves comprising a normally flat, substantially rectangular sheet of resilient metal; a pair of hinges fixed to opposite side edge portions of said sheet adjacent oppositely disposed corners at one end thereof; a pair of side walls having rear edge portions fixed to said hinges and having upper edges which curve upwardly and forwardly from said rear edges, said side walls being movable from a folded position against one face of said rectangular sheet to assembled positions wherein they project in the same direction at substantially a right angle from said sheet, said rectangular sheet being formed with a score line extending transversely thereof in substantially the same horizontal plane as the upper ends of the rear edges of the side walls and being bendable above said score line into contact with the arcuate upper edges of said side walls when said side walls are extended; and latch means for releasably connecting the other end of said rectangular sheet to said side walls to hold the walls in assembled condition.

5. A collapsible hood for kitchen stoves comprising a normally flat, substantially rectangular sheet of resilient metal; a pair of hinges fixed to opposite side edge portions of said sheet adjacent oppositely disposed corners at one end thereof; a pair of side walls having rear edge portions fixed to said hinges and having upper edges which curve upwardly and forwardly from said rear edges, said side walls being movable from a folded position against one face of said rectangular sheet to assembled positions wherein they project in the same direction at substantially a right angle from said sheet, said rectangular sheet being formed with louvres and with a score line extending transversely of said sheet in substantially the same horizontal plane as the upper ends of the rear edges of the side walls and being bendable above said score line into contact with the arcuate upper edges of said side walls when said side walls are so extended; and latch means for releasably connecting the other end of said rectangular sheet to said side walls to hold the walls in assembled condition.

6. A collapsible hood for kitchen stoves comprising a normally flat, substantially rectangular sheet of resilient metal; a pair of hinges fixed to opposite side edges of said sheet adjacent oppositely disposed corners at one end of said sheet; a pair of side walls having rear edge portions fixed to said hinges and having upper edges which curve upwardly and forwardly from said rear edges, said side walls being movable from a folded position against one face of said rectangular sheet to assembled positions wherein they project in the same direction at substantially a right angle from said sheet, said rectangular sheet being formed with louvres and being formed with a score line extending transversely thereof in substantially the same horizontal plane as the upper ends of the rear edges of the side walls and being bendable above said score line into contact with the arcuate upper edges of said side walls when said side walls are so extended, said louvres, when the rectangular sheet is so bent, forming forwardly and upwardly extending passages therethrough; and latch means on the forward upper portions of said side walls for releasably connecting the other end of said rectangular sheet to said side walls to hold the walls in assembled condition.

WALTER W. LOEHER, JR.
LOIS E. LOEHER.

REFERENCES CITED

The following references are of record in the file of this patent:

UNITED STATES PATENTS

| Number | Name | Date |
| --- | --- | --- |
| 260,094 | Hankins | June 27, 1882 |
| 957,642 | Barker | May 10, 1910 |
| 1,001,383 | Geer et al. | Aug. 22, 1911 |
| 1,557,252 | Imsande | Oct. 13, 1925 |
| 2,076,479 | O'Connell | Apr. 6, 1937 |
| 2,087,833 | Boutte | July 20, 1937 |
| 2,248,216 | Bukoski | July 8, 1941 |